June 25, 1963 J. RUDELICK 3,095,008
FLOAT VALVE PARTICULARLY FOR WATER SOFTENER BRINE VESSELS
Filed March 24, 1961 2 Sheets-Sheet 1
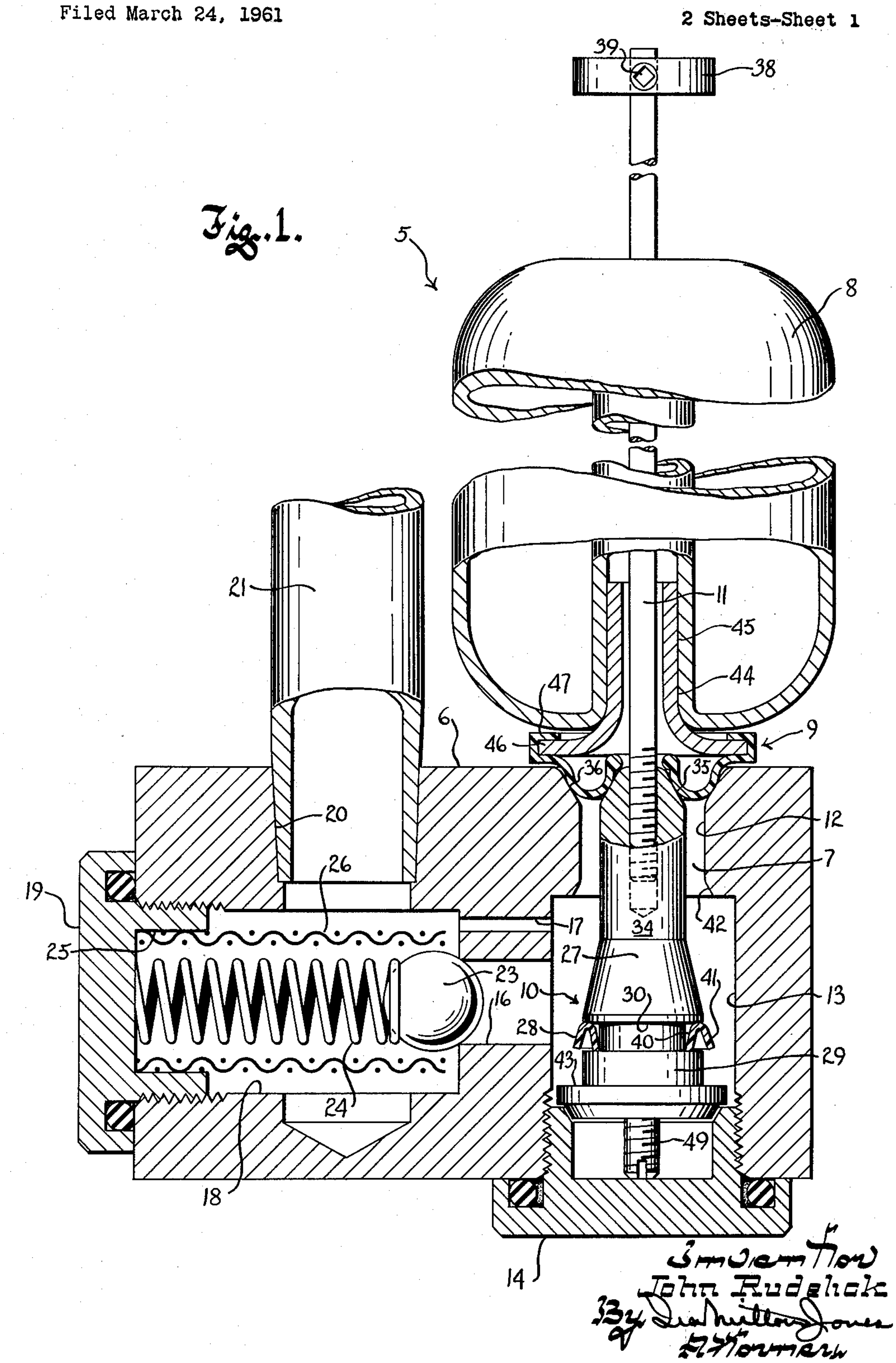
Inventor
John Rudelick
By [signature]
Attorneys June 25, 1963 J. RUDELICK 3,095,008
FLOAT VALVE PARTICULARLY FOR WATER SOFTENER BRINE VESSELS
Filed March 24, 1961 2 Sheets-Sheet 2
Fig. 3.
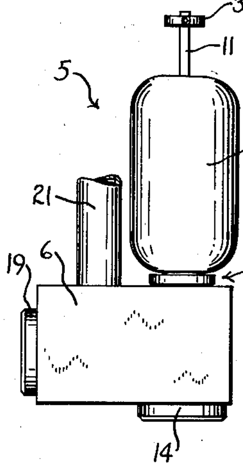
Fig. 4.
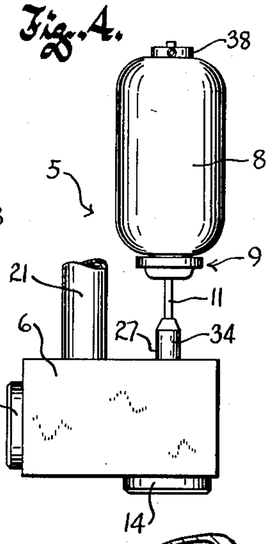
Fig. 2.
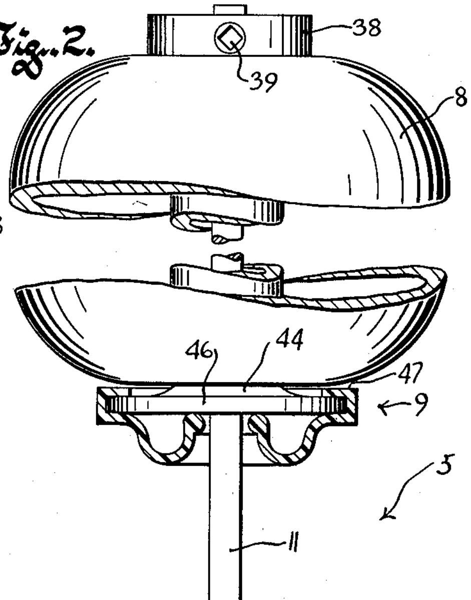
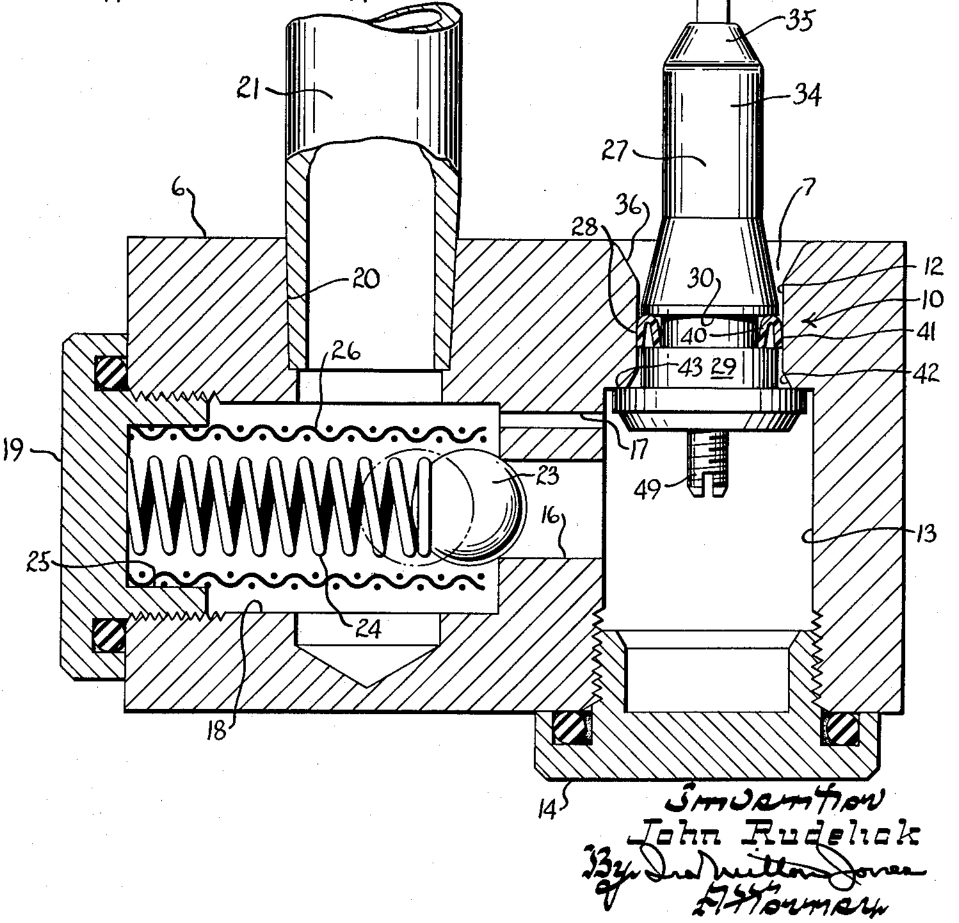
Inventor
John Rudelick
By Ira Milton Jones
Attorney United States Patent Office 3,095,008
Patented June 25, 1963

1

3,095,008
FLOAT VALVE PARTICULARLY FOR WATER SOFTENER BRINE VESSELS

John Rudelick, Milwaukee, Wis., assignor to Bruner Corporation, Milwaukee, Wis., a corporation of Wisconsin
Filed Mar. 24, 1961, Ser. No. 98,250
10 Claims. (Cl. 137—391)

This application is a continuation in part of my application Serial No. 94,916, filed March 10, 1961.

This invention relates to float actuated valves, and refers more particularly to a float actuated valve of the type which stops flow of liquid into a vessel in which the valve is mounted when liquid in the vessel reaches a predetermined high level, and also stops withdrawal of liquid from the vessel when liquid in the vessel falls to a predetermined low level.

Float actuated valves of the type here under consideration are commonly used as so-called brine valves in automatic water softeners, where they are mounted in the bottom of the brine vessel and control the level to which fresh water is filled into the vessel and the level to which brine is withdrawn therefrom. In such water softeners the brine vessel is of course separate from the softening tank that contains the bed of ion exchange material. When the ion exchange material is to be regenerated, brine is transferred from the brine vessel to the softening tank, usually by means of an injector through which a stream of fresh water flows to the softening tank and by which brine is drawn from the brine tank into the fresh water stream. The suction effect produced by the flow of fresh water through the injector opens the brine valve and allows brine to flow out of the brine vessel through the valve until the brine in the vessel falls to a predetermined low levels, and then the brine valve is closed by its float actuator to stop further withdrawal of brine from the vessel and thus prevent eduction of air into the stream of fresh water which continues to flow to the water softening tank. Thereafter fresh water is filled into the brine vessel through the brine valve, to provide for the generation of brine for the next regeneration cycle, and the brine valve is automatically closed by its float actuator when liquid in the brine vessel rises to a predetermined level.

Although a brine valve in a water softener is constantly immersed in salt solution, which could very adversely affect its dependability and service life, it is nevertheless important that such a valve be very rugged and dependable, and be capable of adjustment to provide for accurate control of the high and low liquid levels in the brine vessel. With these requirements in mind, it is a general object of this invention to provide a float actuated valve of the type which is adapted to control both high and low liquid levels in a vessel that is filled and emptied through the valve, and which is well suited for use as a brine valve in a water softener by reason of its superior ability to meet the stringent requirements of such service.

Another and more specific object of this invention is to provide a float actuated valve which closes at predetermined high and low liquid levels and which has simple and inexpensive valve elements that make very good sealing engagement with their seats but do not require any special precision or accuracy in the machining of their seating surfaces.

Another specific object of this invention resides in the provision of a float actuated valve of the character described, having a stem member which guides its float for up and down motion relative to the valve body to insure that the float will at all times occupy a position accurately corresponding to the level of liquid in a vessel in which the valve is mounted, and having means on said stem member providing a seating surface which is engageable by a valve element carried by the float to effect closure of the valve when liquid in the vessel falls to a predetermined low level.

2

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a vertical sectional view through a valve embodying the principles of this invention, with the valve shown in its low liquid level position in which it prevents withdrawal of liquid from the vessel in which it is mounted;

FIGURE 2 is a view similar to FIGURE 1, but showing the valve in its high liquid level position in which it prevents filling of liquid into the vessel in which it is mounted;

FIGURE 3 is a side elevational view of the valve, on a reduced scale, shown in the same position as in FIGURE 1; and FIGURE 4 is a view similar to FIGURE 3, but showing the valve in the same position as in FIGURE 2.

Referring now more particularly to the accompanying drawings, the numeral 5 designates generally a valve embodying the principles of this invention, comprising in general a hollow body 6 having an annular passage 7 therein that opens upwardly to its exterior, a float actuator 8 which carries an outer valve member 9 that blocks the passage 7 when the float actuator drops to a predetermined low elevation, an inner valve member 10 which effects closure of the passage when the float actuator reaches a predetermined high elevation, and a stem 11 extending coaxially upwardly from the inner valve member and which serves as a guide for the float actuator and cooperates therewith in providing a lost motion connection between the float actuator and the inner valve member 10.

More specifically, the valve body 6 is adapted to be mounted near the bottom of a brine vessel (not shown) or the like and may comprise a unitary block of plastic, brass or similar material having a bore 12 opening to its upper surface, which provides the passage 7, and a coaxial counterbore 13 which is closed at its lower end by a plug 14 and which provides a chamber in the valve body in which the inner valve member 10 is received when in its unseated or valve open position. The valve body also has a lateral bore 16 which intersects and opens to the counterbore 13, and a coaxial counterbore 18 which extends to one side of the body but has its outer end closed by a plug 19. Spaced above the bore 16 and paralleling it is a smaller lateral bore 17 which intersects the upright counterbore 13 and opens to the inner end of the lateral counterbore 18. Spaced to one side of the bore 12, so as to intersect the lateral counterbore 18, is another upright bore 20 which opens to the top of the valve body and serves as a port to which an upwardly extending duct 21 is adapted to be connected.

It will be seen that the duct 21 is communicable with the chamber 13 through the lateral counterbore 18 and either of the lateral passages provided by the bores 16 and 17. However, liquid entering the valve body from the duct 21 is constrained to flow to the chamber 13 through only the smaller lateral bore 17 because the lower bore 16 is blocked to in-flowing liquid by a ball check valve 23. Such restricted flow of the incoming liquid prevents the inner valve element from being forced upwardly by the force of the liquid, to where it would block the annular passage 7. The check ball seats against the annular surface defined by the junction of the bore 16 and counterbore 18, and is biased toward its seated position by a coiled compression spring 24 which reacts against the plug 19. The ball check valve of course unseats when suction is applied at the duct 21 to draw liquid out of the chamber 13, so that liquid then flows through both of the lateral bores 16 and 17.

The plug 19 has an inwardly opening well 25 therein in which is received an end portion of a cylindrical screen 26 that extends coaxially through the counterbore 18, and which also receives the outer end of the check valve spring 24. The screen of course prevents foreign matter from being drawn into the duct 21 and also serves as a guide for the check valve ball 23 and its spring 24.

The inner valve member 10, which serves to prevent flow of liquid out of the valve body when the float actuator 8 rises to a predetermined high level, comprises a valve carrier 27 to which the stem 11 is rigidly coaxially secured, an enlarged head 43 on the bottom of the stem, and an annular inner valve element or chevron valve 28. The valve carrier could be formed integrally with the stem as an enlargement of the lower portion thereof, but preferably it is formed as a separate member into the top of which the stem is coaxially threaded. The medial portion 29 of the valve carrier has a diameter somewhat smaller than that of the bore 12 and has a circumferential groove 30 in which the annular chevron valve element 28 is seated.

The upper portion 34 of the valve carrier is substantially cylindrical, so as to cooperate with the surface of the bore 12 in defining the annular passage 7, and it tapers at its upper end portion to provide a radially inner seating surface 35 which cooperates with the outer valve member 9. A divergent bevel 36 at the mouth of the bore 12 provides a radially outer seating surface for the outer valve member 9, and when the valve carrier is in its lowermost position the seating surface 35 thereon is radially opposite the bevel 36.

The float actuator 8 is annular and surrounds the stem to be guided thereby for up and down motion relative to the valve carrier. However, the float also has a lost motion connection with the valve carrier, through the stem, by reason of the provision of a collar 38 which is secured to the stem near the top thereof and which provides an abutment engageable by the float as it rises and by which the float can lift the valve carrier to a position in which the chevron valve element 28 engages the wall of the bore 12 to prevent flow of liquid upwardly through the annular passage 7. The collar 38 is secured to the stem by means of a set screw 39 which allows the collar to be adjusted up and down relative to the stem and which thus provides for adjustment of an upper liquid level at which the valve is closed.

The annular chevron valve element 28 is made of resiliently flexible material, such as rubber or neoprene, and has an inverted V-shaped or U-shaped cross section, with its radially inner leg 40 snugly embracing the bottom of the circumferential groove 30 in the valve carrier. When the chevron valve element is uncompressed its outer leg 41 has a diameter at its free lower end which is slightly greater than that of the bore 12, and as the float actuator raises the valve carrier to the position at which the chevron valve 28 enters the lower end of the bore 12, the chevron valve element is of course compressed between the valve carrier and the bore wall to converge its legs, thus assuring that the valve element will have good sealing engagement with both circumferential surfaces of the annular passage 7. To facilitate such compression of the chevron valve element the bore 12 has a downwardly divergent chamfer or bevel 42 at its lower end. Fluid pressure exerted beneath the chevron valve element after it is engaged in the bore 12 tends to diverge its legs to hold them firmly seated against the wall surfaces of the annular passage, and forces it and the valve carrier upwardly until the head 43 on the valve carrier, at its bottom, engages the downwardly facing abutment provided by the inner end of the counterbore 13. Suction in the counterbore 13 tends to converge the legs of the chevron element, drawing the outer leg 41 out of engagement with the wall of the bore 12 so that the valve carrier can readily move downwardly in the bore 12 in response to such suction, toward the valve open position.

The outer valve element 9 is annular and is formed of rubber, neoprene or similar resiliently flexible material. It is secured to the float actuator by means of a bushing-like fastener 44 having a tubular portion 45 which is snugly received in the bore of the float and which terminates at its bottom in an outwardly flared circumferential flange 46 that is spaced below the bottom of the float. The outer valve element has a radially inwardly projecting rim 47 around its periphery, spaced above the main body portion thereof, to provide, in effect, a radially inwardly opening circumferential groove in which the marginal edge portion of the flange 46 on the bushing is received, with the rim 47 on the valve element overlying the flange.

The main body portion of the outer valve element is substantially U-shaped in cross section, so as to provide radially inner and outer surfaces which respectively engage the radially inner and outer seating surfaces 35 and 36 at the mouth of the passage 7 when the float actuator is in its lowermost position. It is important that both of these seating surfaces be engaged simultaneously by the outer valve element, but this is readily assured by reason of the provision of a set screw 49 which is coaxially threaded into the bottom of the valve carrier and which bottoms on the plug 14 in the lowermost position of the valve carrier to establish an elevation thereof at which such simultaneous engagement of the seating surfaces occurs.

It will be apparent that the outer valve element will be carried down onto its seats by the fall of liquid in a vessel in which the valve is mounted to a predetermined low level, which level depends upon the buoyancy of the float and is accurately controllable, within certain limits, by adjusting the axial depth to which the tubular portion 45 of the fastener 44 is engaged in the float. When the fastener 44 is inserted deeply into the float, as shown in the drawings, the outer valve element does not engage its seats until liquid falls to a minimum low level in the vessel in which the valve is mounted. Adjustments of the fastener which leave it projecting below the bottom of the float provide for higher minimum liquid levels, and it will be understood that substantially high minimum liquid levels can be provided for if the tubular portion 45 of the fastener has substantial length, so that the outer valve element can be disposed a considerable distance below the bottom of the float.

To facilitate axial adjustment of the fastening member relative to the float, the tubular portion 45 of the fastening member can be threaded, if desired, to cooperate with the inner periphery of the annular float. Where the float is made of styrene foam or similar soft material, its inner surface would not have to be provided with a corresponding thread, and the bushing would be self-threading.

From the foregoing description taken together with the accompanying drawings it will be apparent that this invention provides a very simple, inexpensive, accurate and dependable float actuated valve which is adapted to be mounted below the level of liquid in a vessel and which stops the filling of liquid into the vessel when the vessel is filled to a predetermined high level and stops withdrawal of liquid from the vessel when the liquid therein falls to a predetermined low level.

What is claimed as my invention is:

1. In a float actuated valve; a body having a passage opening to its exterior, the body being adapted to be mounted in a vessel with the axis of said passage substantially vertical, and the wall of said passage providing an internal annular seating surface near the upper end of the passage, that faces toward the axis of the passage; a stem carried by the body for axial up and down motion between defined limits with the stem projecting substantially coaxially upwardly through said passage a distance beyond the body; an annular float surrounding the stem and guided thereby for movement toward and from the valve body; a valve member carried by said float and having a resiliently flexible downwardly projecting annular portion of a size to enter the upper end of said passage and sealingly engage said internal seating surface therein upon movement of the float toward the body; and means on said stem providing an external circumferential seating surface which faces away from the axis of said passage and is adapted to be sealingly engaged by said annular portion of the valve member concurrently with its engagement with the internal seating surface in said passage when the stem is in its lower limit of motion, to close said passage.

2. The valve of claim 1, further characterized by cooperating means on the body and on the stem remote from said external seating surface thereof, for defining the lower limit of motion of the stem and providing for its adjustment to a position that insures simultaneous sealing engagement of said annular portion of the valve member with the seating surfaces on the stem and the passage.

3. In a float valve of the type that operates while submerged in liquid in a vessel: a hollow body having a bore that opens upwardly to the exterior of the body and provides one end portion of a passageway through the body by which liquid can be fed into or withdrawn from the vessel; an elongated vertically movable stem having its lower end portion loosely projecting downwardly through said bore and into the interior of the body; cooperating stops on the lower portion of the stem and on the body at its interior, defining the upper and lower limits of stem motion, said stem being biased by gravity to its lower limit of motion; a stop on the upper portion of the stem; a float slidably encircling the stem and engageable with the stop on the upper portion of the stem to lift the stem as liquid in a vessel containing the valve rises toward a predetermined high level; an annular seal member surrounding and carried by the stem for up and down motion therewith, and located to enter the bore from the inner end thereof during float produced upward motion of the stem so as to have sealing engagement with the stem and the wall of the bore intermediate its ends in the upper limit of motion of the stem and thereby close the bore against egress of liquid therefrom; and another annular seal member surrounding the stem and carried by the float, at its bottom for up and down motion therewith, said other seal member being adapted to enter the bore from its outer end when the float descends to an elevation corresponding to a predetermined low liquid level, to sealingly engage the bore and a concentric surface on the stem so to block ingress of liquid into the bore.

4. The float valve of claim 3, wherein each of said annular seal members has a resiliently flexible rim portion that is responsive to the fluid pressure forces that obtain when the seal member is brought to its passage closing position to render the seal member more effective, and is responsive to the fluid pressure forces that are produced when the flow of liquid through the passage reverses, to effect disruption of the seal.

5. In a float valve: a body having a passageway therethrough that includes a chamber in the body, and a reduced bore at one end of the passageway, opening to the exterior of the body from said chamber and providing an outlet for liquid entering the other end of the passageway, the junction between the bore and the chamber defining an abutment that encircles the inner end of the bore, is normal to the axis of the bore, and faces away from said outlet; an elongated valve member mounted in said chamber and bore for reciprocatory motion coaxially of the bore, between an inner position at which fluid in the chamber may exit through said bore, and an outer position closing the bore to prevent egress of fluid therethrough; a float connected with the valve member and operable to move the same from its inner to its outer position in consequence of rising of the float; an enlarged head on the inner end of the valve member defining a circumferential shoulder that faces said abutment and is engageable therewith to define the limit of outward motion of the valve member relative to the body and to close the inner end of the bore; and resilient means on the valve member located to sealingly engage the wall of the bore in said defined outward limit of motion of the valve member to intercept any fluid that leaks past said shoulder and into the bore when the shoulder is engaged with said abutment.

6. In a float controlled valve: a hollow body having a vertical bore opening to its interior, the outer end of said bore opening to the exterior of the body and defining an annular valve seat that faces toward the axis of the bore; a stem carried by the body and projecting coaxially through said valve seat to the exterior of the body; an annular valve member encircling the stem at the exterior of the body and guided by the stem for up and down movement to and from a seated position, said valve member having an annular seal portion of a size and shape to enter the outer end of said bore and providing concentric inner and outer circumferential surfaces, the latter of which sealingly engages said annular valve seat when the valve member is in its seated position; a float guided for up and down motion; means connecting the valve member with said float so that the valve member is raised and lowered thereby; and means in said bore surrounding the stem in radially spaced relation to the wall of the bore and cooperating therewith to define an annular passage through which liquid must flow in passing between the exterior and the interior of the body, said means defining another valve seat which surrounds the stem, faces away from the axis of the bore, and is sealingly engageable by said inner circumferential surface on the seal portion of the valve member concurrently with engagement of the outer surface thereof with said annular valve seat, whereby the valve member is cooperable with both of said valve seats to close said passage against flow of liquid thereinto.

7. In a float controlled valve: a hollow body having a vertical bore opening from its interior and the outer end portion of which opens to the exterior of the body and defines an annular seating surface that faces toward the axis of the bore; a stem carried by the body and projecting coaxially outwardly through said bore to the exterior of the body, said stem being spaced from the wall of the bore and cooperating therewith to define an annular passage through which liquid must flow to enter and leave a vessel in which the body is contained; a float; means on the body guiding the float for up and down motion toward and from the body; a valve member encircling the stem at the exterior of the body and freely movable up and down relative thereto toward and from a seated position, said valve member having a resiliently flexible annular seal portion with a U-shaped cross section all around the same, the annular bight portion of which projects toward the body, and which is of a size and shape to enter the outer end of said passage and to have one leg thereof sealingly engage said seating surface therein in the seated position of the valve member; means connecting the valve member with said float to constrain the valve member to move up and down with the float; and means defining a circumferential seating surface which surrounds the stem, faces away from the stem axis, and is adapted to be engaged by the other leg of said U-shaped annular portion of the valve member concurrently with engagement of the first designated leg thereof with the first designated seating surface in the outer end portion of the passage, to close said passage against flow of liquid thereinto; one of said legs of the annular seal portion on the valve member being free to flex away from the seating surface with which it is engaged in response to fluid pressure forces in the passage to allow liquid to flow outwardly past the valve member in said seated position thereof.

8. The float controlled valve of claim 7, wherein the stem is axially movable relative to the body between defined limits, and further characterized by the following: said means surrounding the stem and defining said circumferential seating surface comprises a valve carrier in the passage which is movable with the stem and has its seating surface engageable by the valve element in the lower limit of motion of the stem; and said valve carrier has a sealing element at its inner end portion which is movable with the stem to a position closing the inner end of the bore in an elevated position of the stem.

9. The float controlled valve of claim 7, further characterized by the following: the means connecting the valve member with the float comprises a fastener having a tubular bushing portion that projects upwardly from the valve member and slidably surrounds the stem, and having a radially projecting flange at the bottom of said bushing portion; the valve member has a portion defining a circumferential radially inwardly opening groove in which said flange on the fastener is received; and said float freely surrounds the stem and is mounted on said tubular bushing portion of the fastener.

10. The float controlled valve of claim 9, further characterized by the fact that the bushing portion of the fastener is axially adjustably connected to the float.

References Cited in the file of this patent

UNITED STATES PATENTS

| | | |
|---|---|---|
| 484,560 | Rhodes | Oct. 18, 1892 |
| 568,858 | Linke | Oct. 6, 1896 |
| 2,904,062 | Techler | Sept. 15, 1959 |

FOREIGN PATENTS

| | | |
|---|---|---|
| 1,147,788 | France | Apr. 19, 1956 |